(No Model.) 4 Sheets—Sheet 1.

P. F. HODGES.
KNOTTING MECHANISM FOR GRAIN BINDERS.

No. 286,819. Patented Oct. 16, 1883.

WITNESSES.
Harry King.
E. D. Walker.

INVENTOR.
Pliny F. Hodges (No Model.)  4 Sheets—Sheet 2.

P. F. HODGES.
KNOTTING MECHANISM FOR GRAIN BINDERS.

No. 286,819.  Patented Oct. 16, 1883.

WITNESSES
Harry King
E. D. Walker

INVENTOR
P. F. Hodges (No Model.) 4 Sheets—Sheet 3.

P. F. HODGES.

KNOTTING MECHANISM FOR GRAIN BINDERS.

No. 286,819. Patented Oct. 16, 1883.

WITNESSES
Harry King.
E. T. Walker

INVENTOR
Pliny F. Hodges (No Model.) 4 Sheets—Sheet 4.

P. F. HODGES.
KNOTTING MECHANISM FOR GRAIN BINDERS.

No. 286,819. Patented Oct. 16, 1883.

WITNESSES
Harry King.
E. T. Walker.

INVENTOR
Pliny F. Hodges

UNITED STATES PATENT OFFICE.

PLINY F. HODGES, OF CHICAGO, ILLINOIS.

KNOTTING MECHANISM FOR GRAIN-BINDERS.

SPECIFICATION forming part of Letters Patent No. 286,819, dated October 16, 1883.

Application filed May 21, 1883. (No model.)

*To all whom it may concern:*

Be it known that I, PLINY F. HODGES, a citizen of the United States, residing at Chicago, in the county of Cook and State of Illinois, have invented certain new and useful Improvements in Knotting Mechanism for Grain-Binders; and I do hereby declare the following to be a full, clear, and exact description of the invention, such as will enable others skilled in the art to which it appertains to make and use the same.

This invention relates to those self-binders for harvesting-machines in which the bundles of grain are bound with twine or cord tied by a knotting mechanism, the principal member of which is a tying-bill.

My improvement consists of certain combinations distinctly set forth in the claims at the close of this specification.

In order that my invention may be clearly understood, I have illustrated in the annexed drawings, and will proceed to describe, the best form thereof at present known to me.

Figure 1:
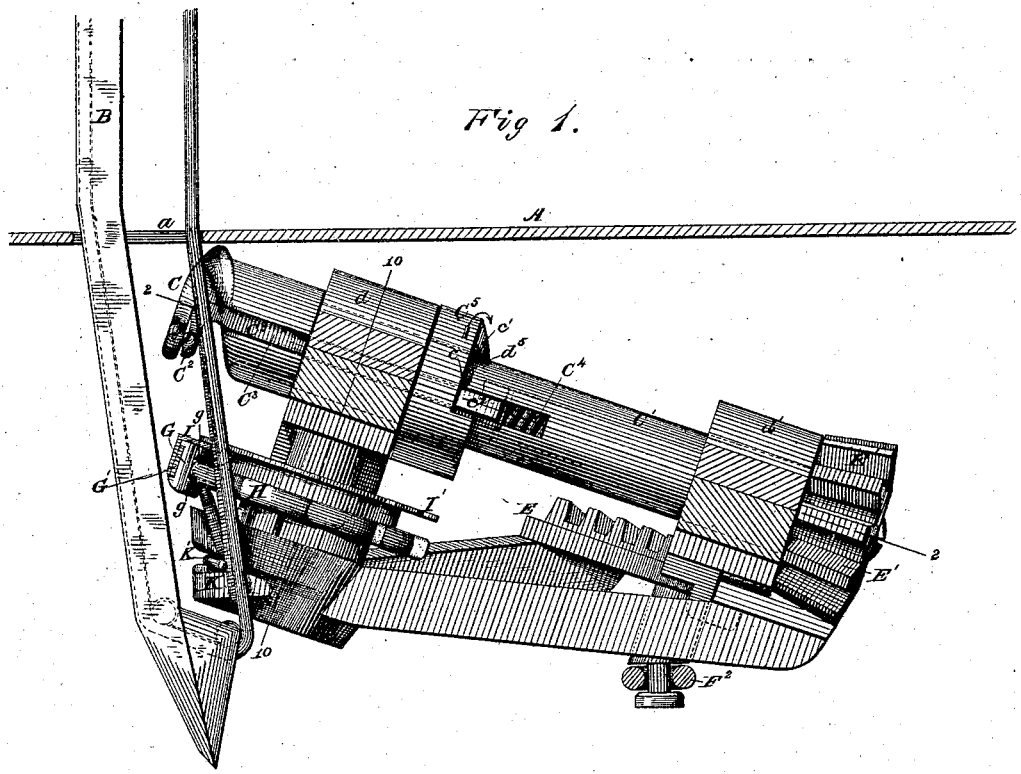
Figure 3:
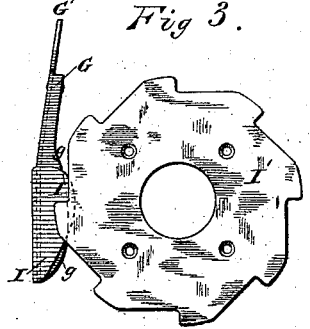
Figure 4:
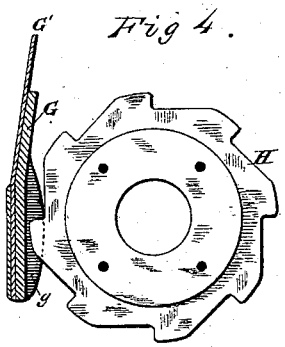
Figure 5:
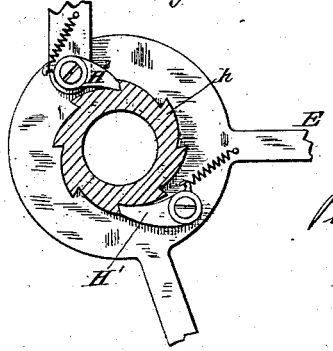
Figure 2:
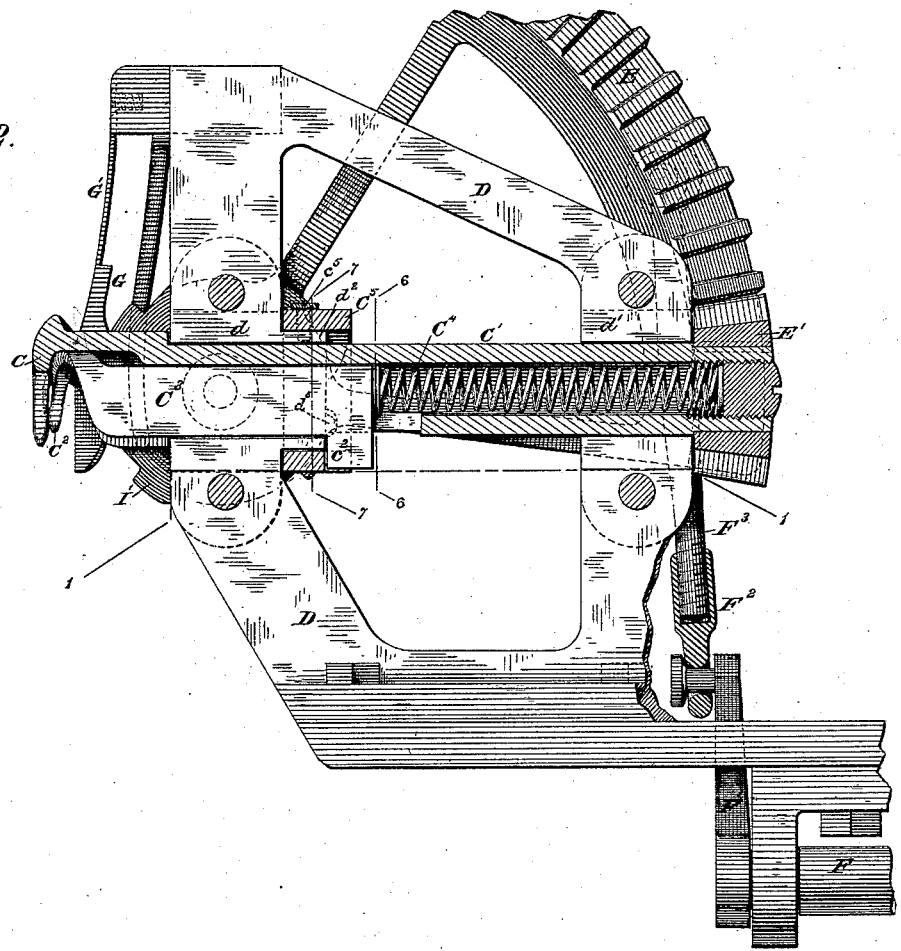
Figure 6:
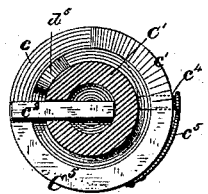
Figure 7:
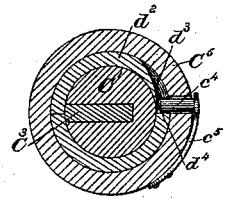
Figure 8:
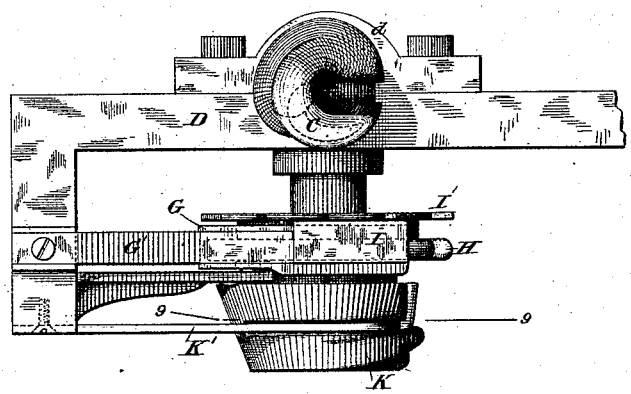
Figure 9:
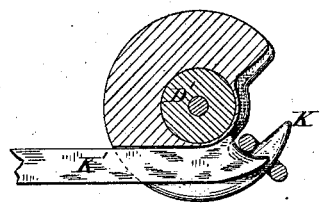
Figure 10:
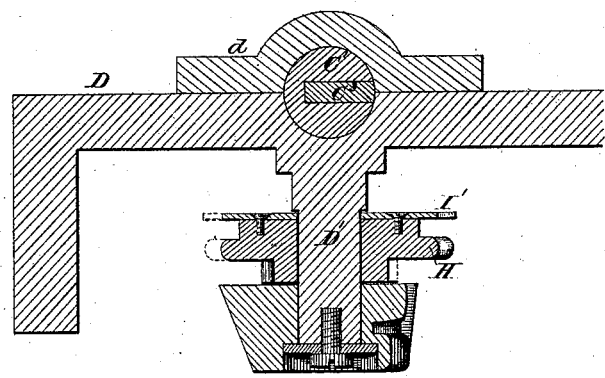
Figure 11:
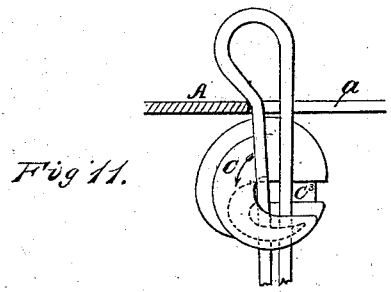
Figure 12:
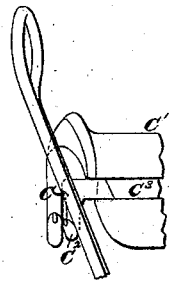

Figure 1 is a sectional elevation, in the planes indicated by line 1 1 of Fig. 2, of my improved knotting mechanism, showing also a part of the binder table or shield, as the case may be, and the outer end of the binder-arm and cord. Fig. 2 is a section of the knotting mechanism, taken in a plane indicated by line 2 2 of Fig. 1. Figs. 3 and 4 are detail views of the cord holder and cutter. Fig. 5 illustrates the ratchet-and-pawl mechanism for operating the toothed wheels of the cord-holder. Fig. 6 is a cross-section in the plane indicated by line 6 6 of Fig. 2. Fig. 7 is a cross-section in the plane indicated by line 7 7 of Fig. 2. Fig. 8 is an end view of the knotting mechanism, parts thereof being omitted for the sake of a better illustration of the other parts. Fig. 9 is a section in the plane indicated by the line 9 9 of Fig. 8. Fig. 10 is a section in the plane indicated by the line 10 10 of Fig. 1. Figs. 11 to 20 illustrate various stages of the operation of tying the knot.

The same letters of reference indicate identical parts in all the figures.

A may refer to the binder-table, or to a plate separating the knotting mechanism from the grain, according as said knotting mechanism is placed under or above the binder-table. A cord-slot, $a$, is formed therein for the passage to the knotting mechanism of the cord and the point of the binder-arm D, which latter may be of any desired construction and operated in any manner, provided, however, that when its point has passed through slot $a$, past the knotting mechanism, as shown in Fig. 1, there will be a space between the binder-arm and that portion of the cord stretching from the eye of the binder-arm to cord-slot $a$, in order to enable the knotter to catch behind the cord between it and the binder-arm. The knotter consists of a hook-head, C, formed on one end of a cylindrical stem, C', and a movable jaw, $C^2$, formed on one end of a shank, $C^3$, arranged and adapted to slide in a longitudinal slot in stem C', the jaw $C^2$ being normally held in contact with the inner side of the hook-head C by the stress of the spiral spring $C^4$, located in a tubular cavity of stem C', between the end of shank $C^3$ and a plug in the rear end of stem C'. The knotter is so arranged that its axis intersects the strands of cord to be tied at an oblique angle, in order that it may properly hook onto and twist said strands into a loop upon itself. The stem of the knotter is journaled in boxes $d$ and $d'$ of the knotter-frame D, which is to be suitably secured to any fixed part of the machine. The stem C' is provided with a shoulder bearing against the outer side of box $d$, to prevent endwise movement in one direction, and endwise movement in the other direction is prevented by bevel-pinion E', which is fixed to stem C', so as to bear with its hub on the outer side of box $d'$. Bevel-pinion E' meshes into the teeth of a segmental bevel wheel or rack, E, which is mounted to turn on the fixed stud D' of the knotter-frame D. The rack E is oscillated by rock-shaft F through the medium of an arm, F', and a pitman, preferably composed of two parts, $F^2$ $F^3$, screwed together, as shown in Fig. 2, so that the length of the pitman may be adjusted for the purpose of adjusting the normal position of the rack, so as to hold the knotter, cord-holder, and associate parts in proper position (that shown in Fig. 1) for laying the strands of cord across it preparatory to tying the knot. The mechanism for oscillating the rack E is constructed to operate in such a way that one oscillation back and forth of the rack will turn pinion E', and through it the knotter, a full rotation in one direction and another full rotation back in the other direction, and the rock-shaft F is rocked intermittently at times when a knot is to be tied, remaining stationary during the intervals. A tubular projection, $d^2$, is formed on the inner side of box $d$, on which projection is fitted a ring, $C^5$, made long enough to project some distance beyond said projection; but for a distance of about ninety degrees the projecting portion of the ring is cut away, so as to make such cut-away portion $c$ of the ring about equal in length to that of the projection $d^2$, and for the distance of another ninety degrees the projecting end of the ring is made slanting, so as to form a cam, $c'$. The cut-away portion $c$ and the cam $c'$ adjoin, and together occupy about one-half of the outer edge of the ring, as best shown in Fig. 6. The shank $C^3$ of the movable jaw $C^2$ is constructed with a laterally-projecting finger, $c^2$, which projects beyond the tubular stem and reaches across the outer edge of the ring $C^5$. A pin, $c^4$, secured to the free end of a spring, $c^3$, fastened to the ring $C^5$, projects through a hole in said ring, and is adapted to enter a recess, $d^3$, in the outer surface of tubular projection $d^2$. The recess $d^3$ is formed with a slanting bottom, beginning at one end at the surface of the projection $d^2$ and terminating at the outer end with an abrupt radial shoulder, $d^4$. Thus it will be understood that the ring $C^5$ may be turned in one direction on the tubular projection; but whenever pin $c^4$ engages shoulder $d^4$ the ring cannot be turned in the other direction. In the normal position of the knotter when at rest, the finger $c^2$ projects into the cut-away portion $c$ of ring $C^5$, close to the shoulder of the square-ended portion thereof, as shown in Figs. 1 and 6, and the pin $c^4$ engages the shoulder $d^4$ of tubular projection $d^2$. A small cam, $d^5$, is formed on the outer edge of tubular projection $d^2$, (see Figs. 1, 2, and 6,) at a point that in the normal position of the knotter said cam $d^5$ will be slightly in advance of finger $c^2$ on the shank of the movable jaw—that is to say, opposite about the middle of the cut-away portion $c$ of ring $C^5$.

The cord-holder for holding the end of the cord consists of a shoe, G, and a toothed grip-wheel, H, the shoe being constructed with flanges $g$, to embrace a part of the toothed edge of the grip-wheel, by the teeth of which the cord is seized and forced into the shoe between the flanges thereof. The shoe is secured to the outer end of a stiff plate-spring, G', fastened to the knotter-frame. The grip-wheel H is mounted to turn on stud D' just above the hub of rack E, and is constructed with ratchet-teeth $h$ around that end of its hub adjacent to the hub of said rack. A pawl, H', is pivoted on the hub of the rack and engages the ratchet-teeth $h$ of the grip-wheel, so that the grip-wheel will be turned during the forward stroke of the oscillating rack. A pawl, H², pivoted to a fixed arm or part of the knotter-frame, is provided to prevent reverse motion of the grip-wheel. A cutting blade or knife, I, is secured to that side of the shoe G nearest the knotter, the cutting-edge of the knife projecting partly beyond the edge of the flange of the shoe, and occupying a tangential position with reference to the grip-wheel. The cord is cut at the time when the grip-wheel forces it into the shoe by drawing it crosswise along the edge of the knife, the effect of which is a draw cut. In order to facilitate the cutting of the cord, I prefer to use a supplemental toothed grip-wheel, I', secured to the hub of the main grip-wheel, so as to rotate in a plane just outside the knife I, so that the cord will be drawn upon on both sides of the knife.

In tying the strands of cord into a knot, it is desirable to supply slack cord to the knotter in that strand the end of which is held in the cord-holder. This I accomplish by means of a slack-hook, K, formed on the hub of rack E. This slack-hook catches over the cord near the eye of the binder-arm before the latter is retracted, so as to double the cord extending between the cord-holder and the eye of the binder-arm over and around the slack-hook on the retraction of the binder-arm, and it releases this doubled portion of the strand of cord when the knotter begins to twist the strands of cord into a loop upon itself. The distance between the cord-holder and the slack-hook is such that the doubled portion of the strand of cord will give sufficient slack for the formation of the loop on the knotter without overstraining either the cord or the mechanism. In order to insure the shedding of the cord by the slack-hook, I provide a fixed stripper, K', secured to the knotter-frame, as shown best in Figs. 8 and 9.

Figure 13:
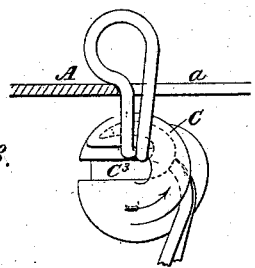
Figure 14:
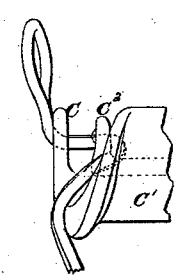
Figure 15:
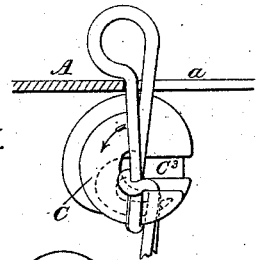
Figure 16:
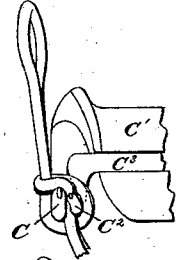
Figure 17:
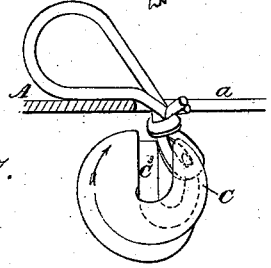
Figure 18:
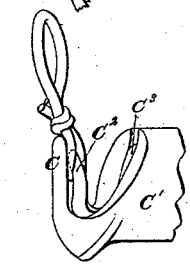
Figure 19:
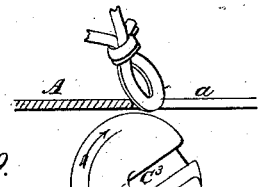
Figure 20:
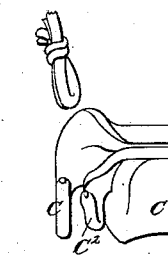

The operation of this knotting mechanism is as follows: Let it be assumed that the end of the cord had been first properly inserted in the cord-holder, a bundle of grain packed on the platform against the cord, and that the binder-arm has just descended through the cord-slot and occupied the position shown in Fig. 1. It will be observed that the strand of cord the end of which is held in the cord-holder passes from the cord-holder around the slack-hook, across the knotter, and out through the cord-slot, while the other strand passes from the eye of the binder-arm over the slack-hook, across the grip-wheels and knotter, out through the cord-slot. Rock-shaft F is now put in motion to oscillate the rack E and start the rotation of the knotter in the direction indicated by the arrows in Figs. 1, 11, 13, and 15. During this rotation the cam-ring $C^5$ is held stationary by its stop-pin $c^4$, so that finger $c^2$ on the shank of the movable jaw $C^2$ will move along the edge of said ring. During the first part of the forward stroke of rack E the slack-hook K is withdrawn from between the doubled portion of the strand held by the cord-holder, and by the time the slack-hook has been entirely withdrawn the knotter begins to twist the strands into a loop upon itself. By the time that the knotter has made a half-turn, as shown in Fig. 13, its movable jaw has been retracted, so as to open the bill, as shown in Fig. 14, by the action of cam $c'$ of cam-ring $C^5$ on the finger $c^2$ on the shank of the movable jaw, in opposition to the stress of spiral spring $C^4$. During the next half-turn in the same direction of the knotter it completes the loop, and also seizes the two strands of cord between it and the cord-holder between its hook-head and its movable jaw, as shown in Figs. 15 and 16, the movable jaw being closed by the resilience of spring $C^4$ the moment finger $c^2$ arrives opposite cut-away portion $c$ of cam-ring $C^5$, which occurs at the completion of the rotation of the knotter in the direction due to the forward stroke of rack E. By the same forward stroke of the rack E the grip-wheels H and I' are turned so as to seize the strands of cord; but the grip-wheels do not crowd the strand into the shoe until at about the completion of the loop on the knotter. Then the strands are crowded into the shoe and cut off. In order that the strands may be crowded into the shoe and cut off after the forward rotation of the knotter has been completed, and before its reverse rotation is commenced, I provide a short blank-track on the rear end of rack E and cut away a portion of one or more of the teeth of pinion E', (after the ordinary manner of construction stop-gears,) and continue the travel of the rack for a short distance in the same forward direction after the knotter has completed its forward rotation, and so arrange the shoe, knife-blade, and grip-wheels of the cord-holder that the strands are crowded into the shoe and cut during the tail end of the forward stroke of the rack after the knotter has come to a standstill. On the return-stroke of rack E the knotter is turned in the reverse direction, as shown by the arrows, Figs. 17 and 19, reaching a position at which the loop can be easily pulled from the bill when it has made about three-quarters of a turn. In the meanwhile the slack-hook has been projected to hook over the strand of cord carried by the binder-arm. In this reverse rotation of the tying-bill the cam-ring $C^5$ is turned with the knotter by the finger $c^2$ on the shank of the movable jaw $C^2$ thereof, and just before the completion of the reverse rotation of the knotter said finger $c^2$ is acted upon by the fixed cam $d^5$, so as to open the movable jaw, to facilitate the release of the ends of the cord, as indicated in Fig. 20. The moment the knotter has completed its reverse rotation the whole knotting mechanism comes to a standstill. The binder-arm is then immediately retracted, so as to stretch the cord above the platform, ready to have another bundle of grain packed against it, the cord extending from the eye of the binder-arm through the cord-slot, across the knotter and the grip-wheels of the cord-holder, around the slack-hook, and back to the cord-holder, by which its end is securely held.

Having thus described my improved knotting mechanism for self-binders, I claim as my invention—

1. The combination, substantially as before set forth, of a knotter provided with a movable jaw, the movable cam-ring for opening said jaw, and the spring for closing it.

2. The combination, substantially as before set forth, of the oscillating rack, the pinion, the knotter provided with a movable jaw, the movable cam-ring for opening said jaw, and the spring for closing it.

3. The combination, substantially as before set forth, of the knotter provided with a movable jaw, the movable cam-ring for opening said jaw preparatory to seizing the strands of cord, the fixed cam for opening it to release the ends of cord, and the spring for closing it.

4. The combination, substantially as before set forth, of the oscillating rack, the slack-hook formed thereon, the cord-holder, and the ratchet and pawl for operating the cord-holder from said rack.

5. The combination, substantially as before set forth, of the slack-hook and the stripper.

In testimony whereof I affix my signature in presence of two witnesses.

PLINY F. HODGES.

Witnesses:
E. T. WALKER,
C. A. NEALE.